Figure 1:
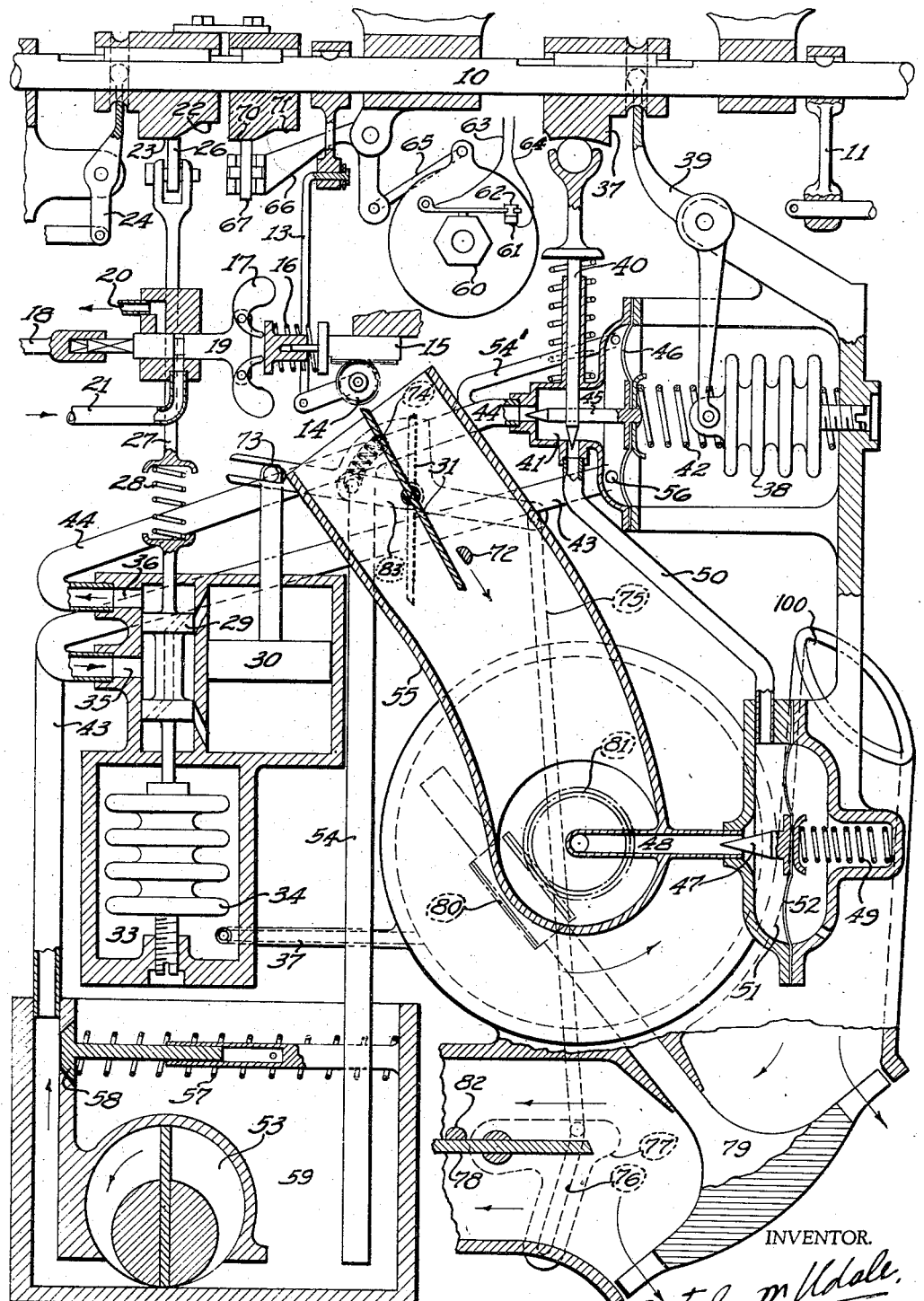

April 3, 1945. S. M. UDALE 2,372,989
ENGINE CONTROL
Filed May 17, 1943 2 Sheets-Sheet 1

INVENTOR.
Stanley M Udale

Patented Apr. 3, 1945

2,372,989

UNITED STATES PATENT OFFICE 2,372,989

ENGINE CONTROL

Stanley M. Udale, Detroit, Mich., assignor to George M. Holley and Earl Holley

Application May 17, 1943, Serial No. 487,223

1 Claim. (Cl. 170—135.6)

The object of this invention is to simplify the controls of the R. P. M., the supercharger pressure and of the mixture ratio of an airplane engine. At the present time airplane engines are usually run with variable pitch propellers by means of which the speed of the engine is controlled by a centrifugal governor. For some years there have been devices which would adjust the throttle of the engine to give any desired boost pressure within certain limits. It is also common in 1943 to mechanically select at any given engine R. P. M. specific boost pressure.

It is also known that it is desirable to simultaneously control the speed of the engine and the boost pressure, and at the same time to be able to select from two mixture ratios at each R. P. M. boost combination an economical ratio and a normal ratio. This is obtained at any given R. P. M. of the engine by arranging so that there will be a specific boost pressure corresponding to maximum mileage and another one to a normal pressure.

It is also known that the fuel air ratio under any given R. P. M. boost pressure combination should vary with the altitude which means that there is a desirable fuel flow for every condition under which the plane can be flown. I have discovered that I can vary the fuel flow by means of the altitude and by means of the position of the control which simultaneously controls the R. P. M. and the boost pressure, and that by having two supercharger pressures to select from, I can select the higher supercharger pressure at any given R. P. M. in order to get a leaner mixture. With the lower boost pressure, I automatically obtain a richer mixture.

The figures show diagrammatically the elements of my invention. The control shaft 10 is controlled by a manually operated control lever 11 and this shaft 10 controls another lever which through a link 13 controls the rack and pinion 15 which controls a spring 16 which engages with a governor 17 rotated by a shaft 18 at a speed proportional to the R. P. M. of the engine. The valve 19 admits hydraulic pressure through a pipe 20. The hydraulic fluid is delivered through a pipe 21. The oil under pressure flows along the pipe 20 to operate the variable pitch mechanism mounted on the hub of the propeller (not shown).

With this arrangement, every position of the shaft 10 corresponds to a definite R. P. M. of the engine. In order that every position of the shaft 10 shall also correspond to a definite boost pressure, the following mechanism is provided: A cam 23 engages with a roller 26 which engages with a rod 27 which compresses a spring 28 which engages with a servomotor valve 29 which controls the servomotor piston 30 which is connected with the throttle 31, through lever 73 which engages with lever 83 mounted on throttle 31 through a spring 74. The throttle 31 is mounted in the passage 55 leading to the supercharger. Hence, any given position of the cam 23 will control the position of the throttle valve 31. A group of partially evacuated capsules 34 located in a closed chamber 33 engages with the valve 29. This chamber 33 is connected through a pipe 37 with the supercharger of the engine. Liquid under pressure is admitted through an opening 35 and discharges through a pipe 36 to provide the operating means for the servomotor piston 30. The oil in the lubrication system can be used in place of the gasoline under pressure.

The double cam 22—23 is shown in Figure 1 keyed to and mounted on the shaft 10 and is slid along the shaft by a manually controlled lever 24. This lever thus selects one of the two cam surfaces 22 and 23, and the selected cam surface is rotated by the shaft 10, and this rotation varies the engine speed as governed by the propeller governor 14—15—16—17—18—19—20—21. By this means, at any given R. P. M. there will be two boost pressures, the higher one giving the more economical fuel consumption and the lower one giving the mixture ratio for the best power.

The fuel flow is controlled by means of a cam 37 which is also slidably mounted on the cam shaft 10. This cam 37 engages with a needle valve 40 which regulates the flow of gasoline along the pipe 50 to the chamber 51 which is bounded on the right by a diaphragm 52. The diaphragm is supported by a spring 49 and controls the movement of a needle 47 which permits the gasoline to flow through the passage 48 to the center of the supercharger. The gasoline is maintained in the chambers 41 and 51 under two constant pressures determined by the springs 42 and 49. The gasoline is supplied from a pump 53 which obtains gasoline from the gasoline supply tank 59 and discharges along the pipe 43 into the chamber 41. The pipe 43 is connected to the entrance 35 to the servomotor so that the gasoline under pressure also acts as the motive power for the servomotor piston 30. The gasoline in the chamber 41 is maintained at a constant pressure because if the pressure rises above the predetermined pressure, a diaphragm 46 moves the needle 45 to the right and allows the fuel to escape through the pipe 44 which is connected with the pipe 54 and returns the gasoline to the tank. The gasoline under pressure enters chamber 41 through a restricted opening 56 and escapes through an opening controlled by the needle valve 45 so that when the needle 45 moves to the right under the influence of excessive pressure in the chamber 41 the pressure in 41 falls to that determined by the spring 42.

The cam 37 is slid to the right and left by means of an aneroid 38 which moves a lever 39 which engages with the cam 37. With this arrangement, the fuel flow past the needle 40 is determined solely by the position of the valve 40 as there is a constant pressure difference between the chamber 41 and the chamber 51.

The position of the needle 40 is determined by the angular position of the shaft 10 which varies directly with R. P. M. and with the position of the cam 37 in the shaft 10 which varies with altitude. Hence, at any given altitude at any given speed there is a definite amount of gasoline admitted through pipe 48 to the center of the supercharger. A cam 70 controls the spark advance through a lever 66 which engages with the circuit breakers 60, 61, 62, 63, and 64 through the link 65. The roller 67 engages with the cam 70 and with the cam 71 when the lever 24 is rotated anticlockwise. There is thus a specific spark advance for every R. P. M. of the engine and for every M. A. P.

An exhaust pipe 100 supplies exhaust gas to drive a supercharger through a turbine 79 so as to provide the additional air called for when the downward motion of the servomotor piston 3 no longer opens the throttle 31, because throttle 31 then engages with stop 72.

The piston 30 can continue to move as the lever 73 engages with the throttle lever 83 through a compression spring 74, which permits over travel of the lever 73.

Lever 73 is connected to a lever 77 through a link 75. A slot in lever 77 permits over travel in the opposite direction so that when the throttle 31 is closed, the link 75 can descend, its lower end sliding in the slot 76.

The lever 73, when rotated anti-clockwise, rotates the link 77 anti-clockwise and closes the valve 78, thus forcing the exhaust gases through the turbine 79 so as to drive the supercharger faster until the supercharger provides the pressure to the chamber 33 to bring the servomotor valve 29 into the position of equilibrium in which it is shown.

The exhaust throttle 78 engages with the stop 82 when it is wide open, that is, when the engine is controlled by the throttle 31. Then the exhaust escapes to the left from pipe 100 past the valve 78.

The turbine shaft has a worm drive 80, driving a wheel 81, which carries the blower.

In the operation of the fuel pump 53, a relief valve 58, loaded by a spring 57, prevents excessive pressures in the pipe 43.

A bypass 54' connects the chamber 41 with the return pipe 44 and therefore with the return pipe 54. The purpose of this is to insure at all times a circulation of fuel through the chamber 41 and to reduce the amount of fuel that escapes past the valve 45.

Figure 2:
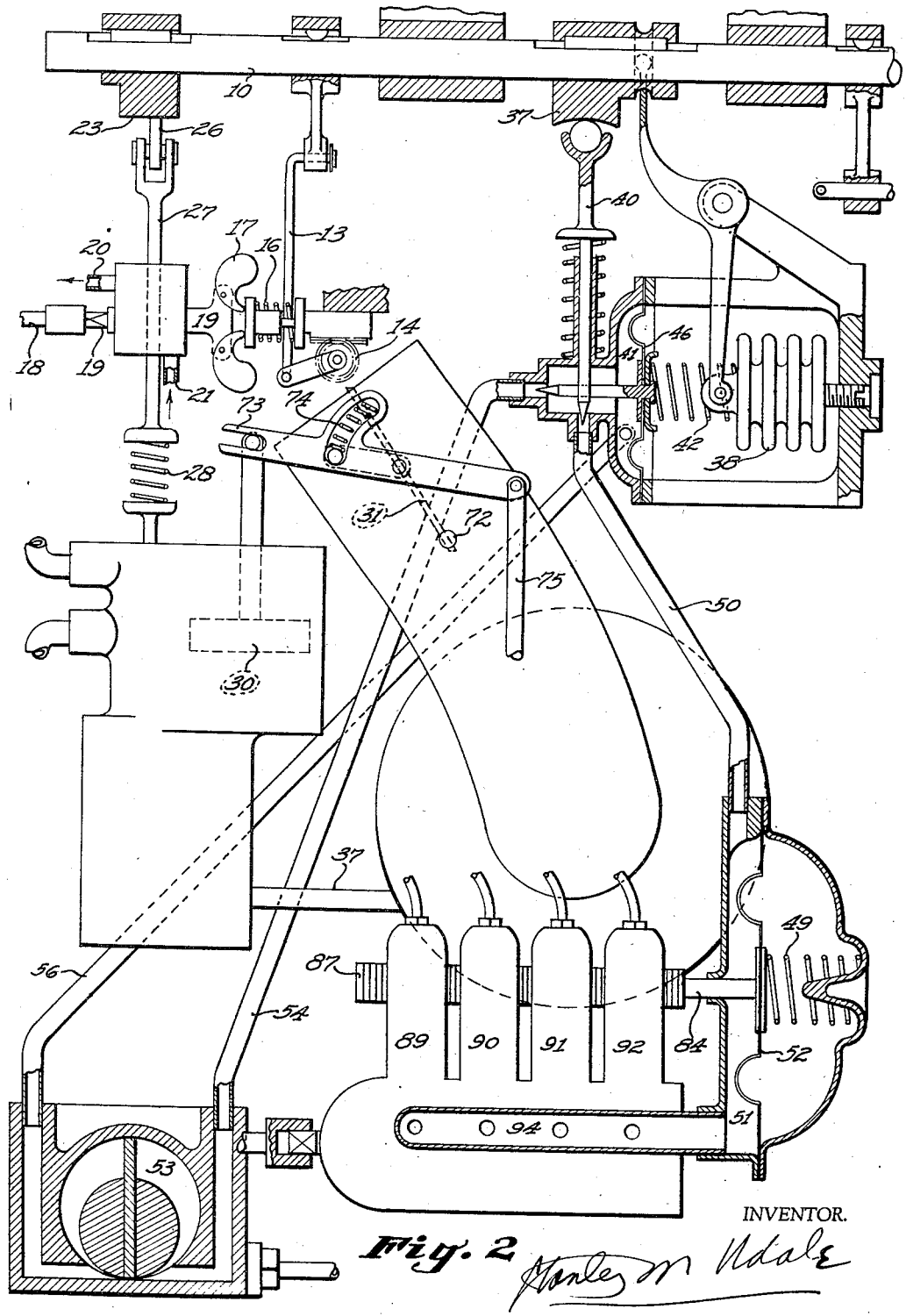

Fig. 2 shows an alternative in which fuel injection is used in place of injection into the supercharger. The diaphragm 52 is now shown connected through a rod 84 with a rack 87 which regulates the discharge from the individual fuel pumps 89, 90, 91 and 92 which supply fuel to the individual cylinders of the internal combustion engine. These pumps comprise a well known fuel injection pump. The fuel enters these pumps through pipe 94. The remaining parts of the control system remain as before. In Fig. 2, for simplification, the ignition has been omitted and also the mixture control lever 24. The operation of device shown in Fig. 2 when the cam 37 determines the opening of the needle valve 40, a certain flow takes place down the pipe 50 to the fuel passage 94 and assuming that the engine has been speeded up, then there is an increased pressure in the chamber 51 against diaphragm 52, compressing spring 49 which moves the rack 87 to the right and the flow through the pipe 94 increases, which decreases the pressure in chamber 51 until equilibrium is reached. Thus, when the engine speed is increased, there is an increased flow of fuel.

What I claim is:

A manual control means for airplane engines, having a variable pitch constant speed propeller, and an air entrance and a throttle valve therein, and a supercharger, the pressure wh'ch is developed by said supercharger being adapted to be controlled by said throttle valve, a centrifugal governor adapted to control the pitch of said propeller to give the desired engine speed, a throttle adjusting device responsive to the pressure of said supercharger, said manual control means being adapted to vary the said pressure to which the throttle is adjusted and to determine the speed at which the governor will be in equilibrium so that the manual control means selects the corresponding pressure to be developed by said supercharger and at the same time selects the desired engine speed, a supply of fuel under constant pressure, a metering valve controlling the flow of fuel, a cam having a double curvature, said manual means being adapted to move said cam in one direction so as to regulate the position of the valve at each desired engine speed, means for moving said cam in a second direction at right angles to the first direction, barometric responsive means adapted to move said cam in said second direction, whereby at each selected engine speed the fuel supply is varied for changes in altitude, and at each altitude the fuel supply is varied for each change in the engine speed selected.

STANLEY M. UDALE.